United States Patent
Zmek et al.

(10) Patent No.: US 9,500,837 B2
(45) Date of Patent: Nov. 22, 2016

(54) BONDING STRUCTURE WITH CTE GRADIENT FOR MOUNTING AN OPTICAL ELEMENT IN A FRAME

(71) Applicant: Goodrich Corporation, Charlotte, NC (US)

(72) Inventors: William Zmek, Bethlehem, CT (US); Steven Podyma, New Milford, CT (US); Monty Kennedy, Brookfield, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 45 days.

(21) Appl. No.: 14/294,245

(22) Filed: Jun. 3, 2014

(65) Prior Publication Data

US 2015/0343885 A1    Dec. 3, 2015

(51) Int. Cl.
*G02B 7/02* (2006.01)
*B60J 1/00* (2006.01)

(52) U.S. Cl.
CPC ............. *G02B 7/028* (2013.01); *B60J 1/004* (2013.01); *G02B 7/025* (2013.01); *Y10T 156/10* (2015.01)

(58) Field of Classification Search
CPC ......... B60J 1/007; B60J 1/006; B32B 37/12; B32B 37/18; B32B 37/142; B32B 2307/40; B32B 2605/00; G02B 7/028; G02B 7/025; Y10T 156/10
See application file for complete search history.

(56) References Cited

U.S. PATENT DOCUMENTS

| | | | | |
|---|---|---|---|---|
| 2,382,963 | A * | 8/1945 | Dodge | B64C 1/1492 156/106 |
| 4,364,595 | A * | 12/1982 | Morgan | B60J 1/10 296/146.15 |
| 4,699,335 | A | 10/1987 | DeOms et al. | |
| 5,150,943 | A * | 9/1992 | Gold | B60J 1/10 296/201 |
| 6,097,553 | A | 8/2000 | Griffin | |
| 6,689,240 | B2 | 2/2004 | Jesse | |
| 7,002,139 | B2 | 2/2006 | Stallard et al. | |
| 7,028,950 | B2 * | 4/2006 | Salmon | B29C 70/763 244/129.3 |
| 9,169,686 | B1 * | 10/2015 | Podyma | E06B 1/26 |
| 2005/0029666 | A1 * | 2/2005 | Kurihara | H01L 21/561 257/772 |
| 2006/0182941 | A1 * | 8/2006 | Yano | B82Y 30/00 428/292.1 |
| 2009/0324858 | A1 * | 12/2009 | Jaeger | E06B 3/6612 428/34 |
| 2010/0067123 | A1 * | 3/2010 | Hayata | G02B 7/008 359/738 |
| 2012/0064512 | A1 | 3/2012 | Li et al. | |
| 2012/0228428 | A1 | 9/2012 | Deganis et al. | |

* cited by examiner

*Primary Examiner* — Jeanette E Chapman
(74) *Attorney, Agent, or Firm* — Cantor Colburn LLP

(57) ABSTRACT

An athermalized window assembly intended for mounting in or on the exterior of a vehicle and associated method, the assembly comprising a window arranged with one or more mounting members in an opening in a plate. The coefficient of thermal expansion of the mounting members is between a coefficient of thermal expansion associated with the window and a coefficient of thermal expansion associated with the plate. The mounting members may comprise a plurality of skirts that form a coefficient of thermal expansion gradient between the window and the plate.

8 Claims, 3 Drawing Sheets

BONDING STRUCTURE WITH CTE GRADIENT FOR MOUNTING AN OPTICAL ELEMENT IN A FRAME

BACKGROUND

The present disclosure relates generally to windows and methods of mounting such in a bezel or frame and, more generally, to precision optical elements and methods for mounting or bonding precision optical elements into a frame or bezel, which provides an attachment interface to an aircraft for use with optical systems.

Precision optical elements such as windows, lenses and the like, are often mounted on vehicles for use with high performance optical systems. A window or other precision optical element may be arranged to enhance the ability of the optical system and/or to protect the optical system from the environment. Such optical systems are used in vehicles, (e.g., aircraft, ground vehicles, sea-going vessels, and the like), to gather data at various points during travel of the vehicle.

The windows must be mounted in such a manner that the connection between the window and a frame can withstand the stresses exerted on it by mechanical loads or forces thereabout imposed during system operation, such as net air pressure, enforced displacements of the vehicle interface, dynamic loads, and thermal loads. The connection between the window and the frame, which may employ, for example, mechanical fasteners or a bonding agent (adhesive) such as epoxy, or an elastomer, often must also be sealed; not allowing air to escape or enter. Stresses on the window and the connection to the frame may be the result of material differences, wherein the coefficient of thermal expansion (CTE) is different between the materials of the precision optical element and the frame, respectively. Therefore, the interface or connection between these two materials is not only acted upon by the forces resulting from net pressure and other mechanical disturbances, but also by forces arising in consequence of the difference in expansion and contraction of the windows on the one hand and the frame on the other hand. Consequently, this connection must be able to withstand comparatively great forces. In some applications, such as where the window is used in connection with a sensitive optical device, it is also desirable to minimize the stresses on the window itself by choice of interface materials and concomitant interface design configuration choices in order to reduce the distortion of light or other electromagnetic phenomena passing through the window.

For example, the stresses imposed after a temperature change on a precision optical element assembly consisting of materials having differences in CTE (e.g., a metal frame, an elastomer bond, and a glass window) can be relieved by choosing a compensatory thickness of an adhesive material. This common practice, known as "athermalization," compensates for the difference in thermal expansion by employing an adhesive that will freely expand and contract based upon the relative forces. This current solution often employs elastomer adhesives, e.g. silicone-based adhesives such as room temperature vulcanizing (RTV) silicone, that are capable of compressing/expanding under the thermal stresses. In an athermalized design, greater differences between thermal expansion rate of the frame, (e.g., bezel, window frame, etc.), and the window requires an increased thickness of the bond layer in order to adequately compensate for the forces that result from a change in temperature. Often, such mismatches can drive the bond layer thickness beyond values that are considered to be safe for structural integrity of the window assembly over its required lifetime. The industry is therefore receptive to mounting assemblies and methods of mounting windows that improve structural integrity and/or preserve optical clarity.

SUMMARY

Disclosed herein is a mounting assembly for an optical element arranged in an opening in a plate or other structure. One or more mounting members having a coefficient of thermal expansion (CTE) that is between a CTE of the plate and a CTE of the window is arranged between the window and the plate. A bonding agent is disposed with the one or more mounting members.

Another aspect of the disclosure provides a method for installing a window assembly into a vehicle. One or more mounting members are prepared having a coefficient of thermal expansion (CTE) that is between a CTE of an aircraft structure and a CTE of a window to be placed in an opening in the aircraft structure. The one or more mounting members and the window are arranged in the opening in the frame or bezel structure with a bonding agent, with the mounting members substantially surrounding the window.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure. In particular, the disclosure provides various examples related to windows for any form of vehicle such as an aircraft and methods for mounting windows in such vehicles, whereas the advantages of the present disclosure as applied in a related field would be apparent to one having ordinary skill in the art and are considered to be within the scope of the present invention.

Figure 1:
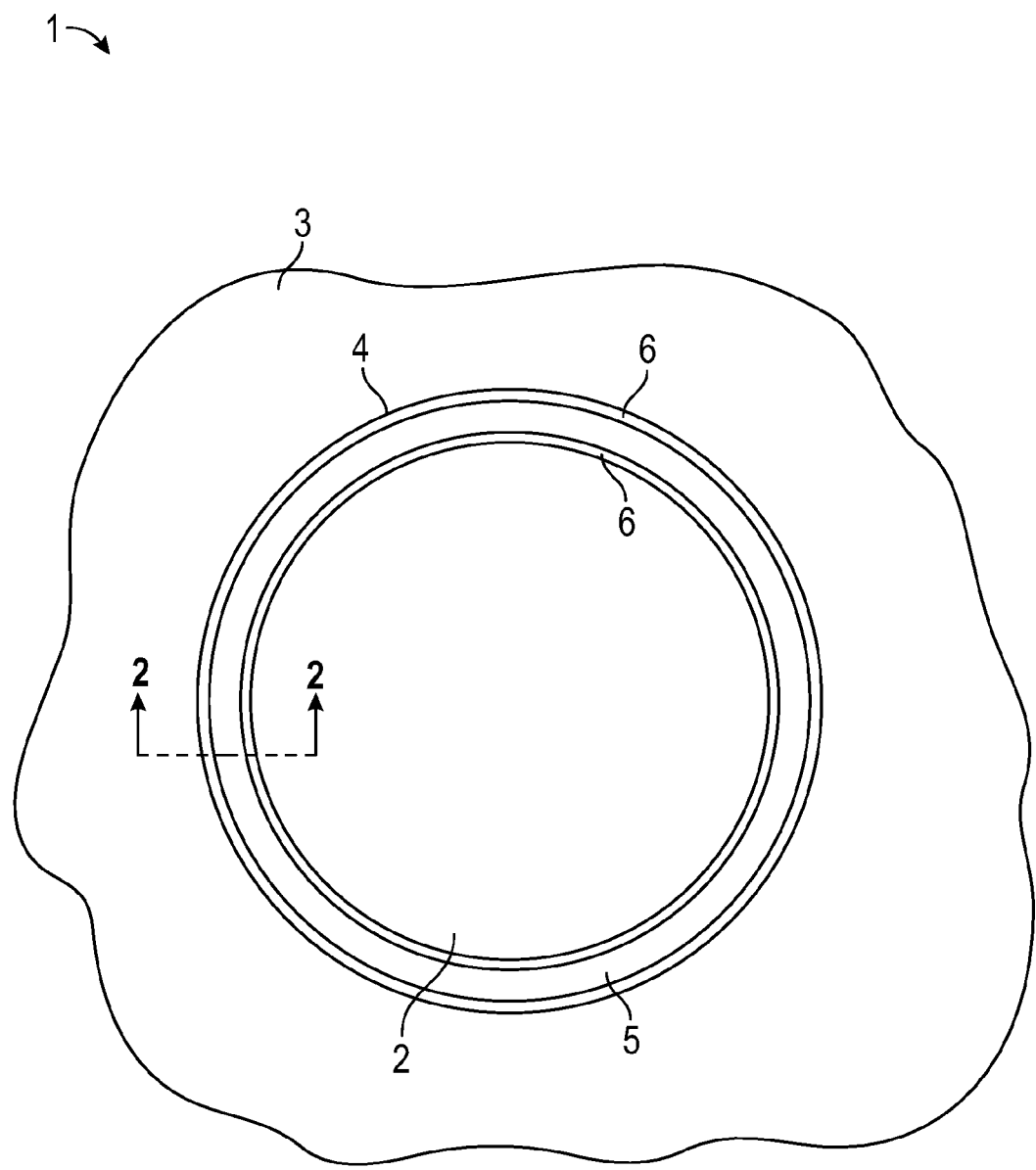
FIG. 1 is a front view of a window assembly according to one embodiment.
Figure 2:
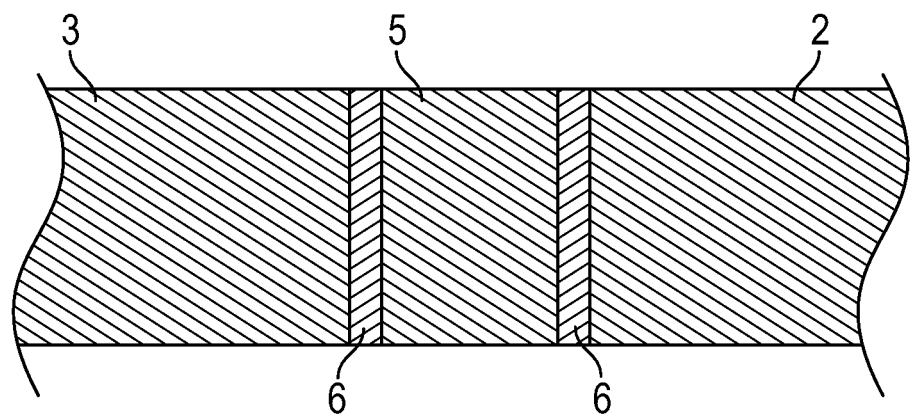
FIG. 2 is a sectioned side view of a portion of the window shown in FIG. 1, along section line A-A.

Referring to FIGS. 1 and 2, the present disclosure provides a window assembly 1 that comprises a window 2 set in a plate 3. An opening 4 is formed in the plate to accommodate the window 2. A mounting member 5 is placed between the window 2 and the plate 3 along with a bonding agent 6. The window assembly 1 may be a precision optical element assembly, with the window 2 being replaced by any precision optical element, such as a lens, filter, etc. The shape of the window 2 and the corresponding opening 4 in the plate may be any shape suitable for a particular application. For example, the window may be circular, elliptical, rectangular, or any simple or complex shape depending on the intended end use.

The mounting member 5 can be formed as a single, solitary member or a plurality of individual members that at least substantially surround the window 2 within the plane of the plate 3. The plurality of members may comprise a plurality of segments arranged along a perimeter of the window 2, or a plurality of skirts arranged substantially concentrically around the window 2. Further, the members may include both segments and skirts in combination, as discussed below.

The plate 3 forms a portion of a vehicle structure, such as an aircraft fuselage or cockpit. The plate 3 may be formed from any suitable material including metals and carbon fiber composites. The shape of the plate 3 may be flat or curved or some other complex three-dimensional shape. The opening 4 formed in the plate has a shape that is complementary to the shape of the window 2, whether round, oval, rectangle, or some other simple or complex shape. The size and shape of the opening is also chosen to accommodate the mounting member 5 and the bonding agent 6. The plate 3 may comprise two or more portions, each having a part of the opening 4 formed therein, the portions joining together to form the opening 4, or may comprise a single part containing the opening 4 with multiple other parts fastened together to provide the equivalent function of the plate.

The window 2 is formed from any appropriate transparent, semi-transparent, or visibly opaque material that can meet the requirements for a particular application, which may include filtering specific portions of the electromagnetic spectrum. The window may be flat or curved, such as a convex window. Further, the window 2 of FIG. 1 is circular, but the window may be any other shape, as mentioned above.

The bonding agent 6 is chosen according to the needs of the particular application, as will be apparent to those in the art. In some examples, the bonding agent 6 is a compliant adhesive (elastomer) that elastically expands or contracts with the mounting member 5, the plate 3, and the window 2. Current solutions, for example, often employ silicone-based adhesives that easily expand and are resistant to most environmental factors. In some examples of the present disclosure, the mounting member 5 is configured to reduce the size of a particular adhesive joint that would otherwise be required to compensate for the differences in thermal expansion properties between the aircraft structure and the window 2. In general, the mounting member 5 is configured to reduce the radial thickness of adhesive between itself and the aircraft structure, and likewise between itself and the window 2, while still compensating for the differences in thermal expansion properties between these elements. Typically, the radial thickness of a standard athermalized adhesive joint designed without a mounting member 5 would very nearly equal the total thickness of adhesive in an equivalently athermalized design having a mounting member 5. Roughly speaking, each adhesive joint in the latter design (an embodiment of this patent) would be half the thickness of the former design (representing prior art). This near-halving of the adhesive joint thickness (radial direction) strongly improves the structural integrity of the joint.

The present disclosure provides advantages over various current window assembly designs having necessarily thick athermalized bond joints, by restoring structural integrity to the bond joints while retaining athermalization of the structure (in order to reduce the amount of stress on the window 2 resulting from thermal expansion), and while retaining joint compliance (thereby partially isolating the window from differential displacements imposed on the frame by the vehicle such as twist). The mounting member 5 is formed from a selected material that has a coefficient of thermal expansion (CTE) that is between a CTE of the plate 3 and a CTE of the window 2. As further discussed below, this manner of dividing the interface joint by "stepping" up or down the CTE between the window and the plate restores structural integrity by reducing the individual elastomer joint thicknesses, while retaining the athermal and compliant properties of the joint, which reduce stresses on the window resulting from thermal expansion or mechanical strain, which could damage the window, or otherwise refract or distort the light passing through the window.

The term "gradient," as used herein to describe the change in CTE between the window 2 and the plate 3, including any intervening mounting member 5 or mounting members, denotes a progression in CTE between the respective elements. The CTE "gradient" may refer to an incremental increase or decrease in CTE when progressing from the window 2, to the mounting member(s) 5, to the plate 3. Further, the CTE "gradient" may progress evenly, or substantially evenly, or may be irregular.

The bonding agent will typically have a CTE that is higher than any of the window 2, the plate 3, and the one or more mounting members 5. Further, one advantage of the present disclosure is that the radial thickness of the bonding agent 6 in the window assembly 1 is minimized for each connecting layer, and each layer will be thinner than a single connecting layer used in a traditional athermalized design.

Figure 3:
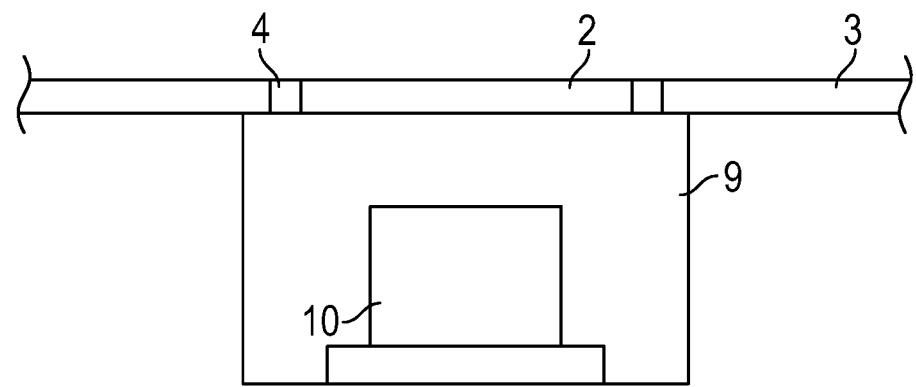
FIG. 3 is a sectioned side view of a window assembly according to another embodiment.

Another example is shown in FIG. 3, in which the window assembly 1 includes a compartment 9 enclosed by the mounted window 2. An optical device 10 may be at least partially housed in the compartment 9. The compartment 9 may be a pressurized compartment. The optical device 10 may be a camera or other sensor of light and electromagnetic phenomena or may be a laser or other electromagnetic emitter. The window assembly 1 may be configured to minimize optical distortion in the window which may benefit both the reception and transmission of electromagnetic phenomena.

Figure 4:
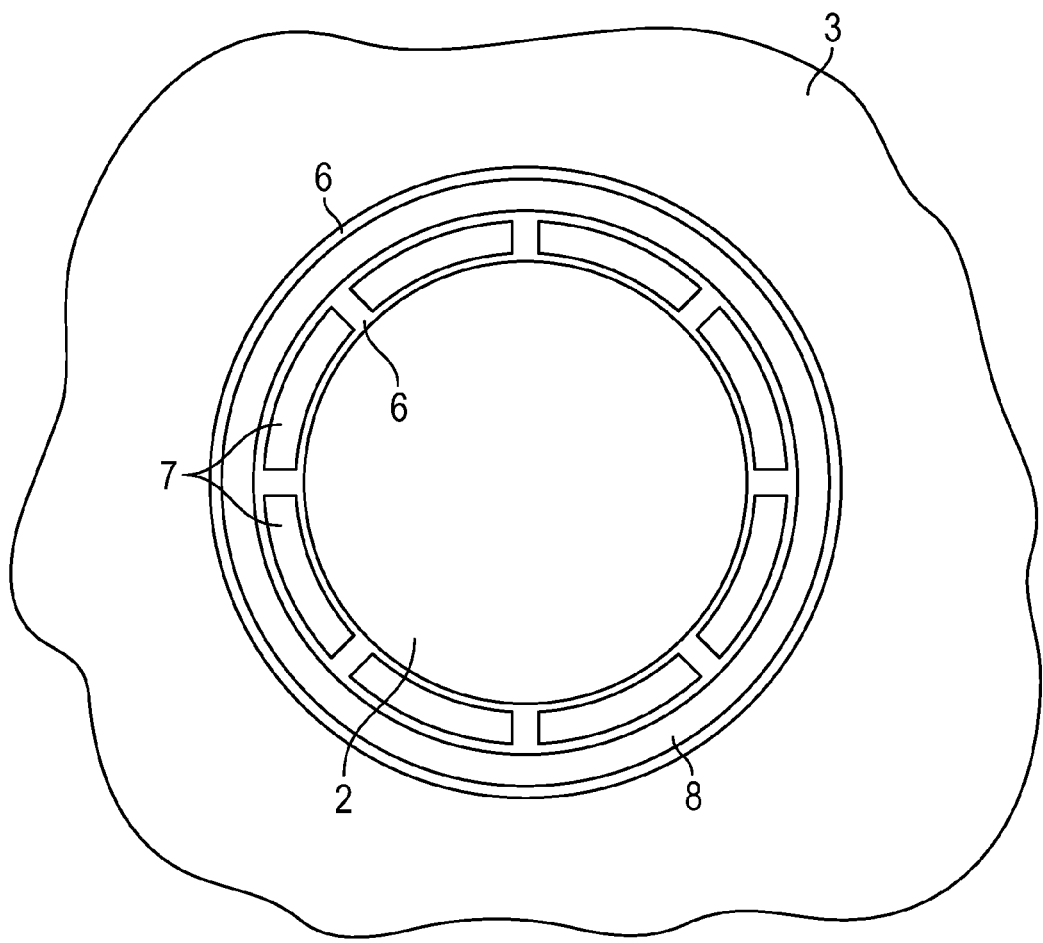
FIG. 4 is a front view of a window assembly according to another embodiment.

FIG. 4 illustrates an alternate configuration in which the mounting member 5 of the above description is replaced by an inner skirt 7 and an outer skirt 8. The inner skirt 7 and the outer skirt 8 are both substantially concentric with the window 2. As shown in FIG. 4, the inner skirt 7 is composed of a plurality of segments arranged coextensively. In other examples, the inner skirt 7 is formed as a single member. Alternatively, both the inner skirt 7 and outer skirt 8 may be composed of a plurality of segments. In other examples, the mounting structure may include three or more skirts.

In the arrangement shown in FIG. 4, each skirt is formed having a different coefficient of thermal expansion (CTE). In one example, the plate 3 is an aircraft fuselage formed from a material having a CTE of approximately $13 \times 10^{-6}$ in/in·° F. and the window 2 is formed from a material with a CTE of approximately $1 \times 10^{-6}$ in/in·° F. In this example, the inner skirt 7 may be formed from a selected material with a CTE of approximately $5 \times 10^{-6}$ in/in·° F. and the outer skirt 8 may be formed from a selected material with a CTE of approximately $9 \times 10^{-6}$ in/in·° F., and the bond material 6 may be a material with a CTE of approximately $100 \times 10^{-6}$ in/in·° F. Where the adhesive material forming the bonding agent 6 has a CTE much higher than the other materials of the assembly, which will typically be the case, the order of stepping down in CTE from plate to window will be further aided by the bonding agent 6. In other embodiments, where the window material has a CTE that is higher than the material forming the plate, a joint material with a CTE lower than the CTE of the material forming the plate will be most useful. The resulting structure forms a CTE gradient between the window 2 and the plate 3.

One embodiment comprises an athermalized circular window design mounted in a circular assembly in a plate. As in the example above, the material forming the plate has a CTE that is higher than a CTE of the material forming the window. In this example, the sum of thicknesses of the layers of bonding agent in the radially outward direction—independent of the number of skirts interposed into the joint—will be very slightly larger than the thickness of the un-stepped athermalized joint, (prior art), that this embodiment would replace. Further, if the CTE of an embodiment having a single member 5 is exactly the average of the plate 3 and window 2, then each layer of bonding agent 6 has a thickness very slightly greater than a preceding (radially inward) layer. If the single member 5 has a CTE that is not exactly the average of the plate 3 and window 2, then the relative thicknesses of the bonding agent 6 will diverge slightly. Even so, the total thickness of the bonding agent would be essentially the same as with a member 5 with the average CTE.

When temperatures rise, the window 2 in a realization of the design will most commonly expand at a rate less than that of the plate 3. In the example above (including the CTEs recited therein), when temperatures rise, window 2 expands at a rate approximately one thirteenth that of the plate 3. The inner skirt 7, however, expands at a rate that is closer to the rate of expansion of the window 2, allowing a thin layer of adhesive situated between the ID of the inner skirt 7 and the OD of the window 2 to compensate for the difference. Similarly, the difference in expansion rate between the outer skirt 8 and the inner skirt 7 and between the plate 3 and the outer skirt 8 are close enough for a thin layer of adhesive situated between the ID of the frame and the OD of the outer skirt, and likewise between the ID of the outer skirt and the OD of the inner skirt, to compress or expand as the temperature changes enough to reduce or substantially eliminate the residual stresses on the window. Thus, this arrangement reduces the thermal stresses placed on the window 2 without the use of an excessive thickness of adhesive.

While the previous example assumes a liner CTE for each of the materials involved, the particular materials (or the target CTEs, as it may be) can be chosen for a critical temperature range. Further, the number of divisions of the bond line may be increased significantly by using a nested set of many skirts, each made of a thin band of material having a CTE intermediate to its adjacent neighbors. The thin layers of materials, each layer forming a substantially concentric skirt, may then be assembled into a single part using adhesive, to form a ring-shaped mounting structure that itself will fill the gap between the ID of the frame and the OD of the window and will be affixed to same with adhesive, and that will be consistent with the advantages of the present disclosure.

Figure 5:
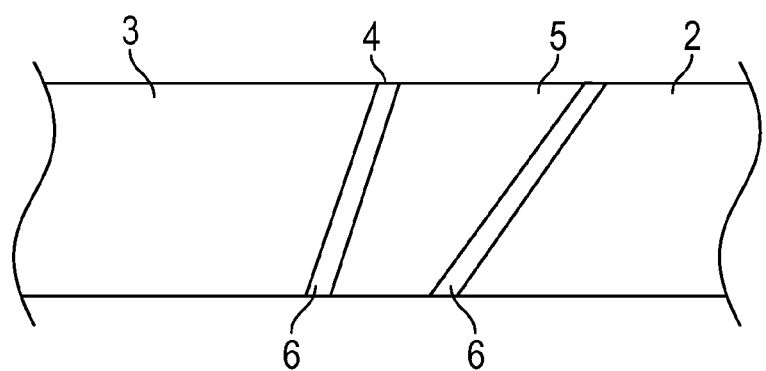
FIG. 5 is a sectioned side view of a window assembly according to another embodiment.

FIG. 5 illustrates another embodiment in which the opening 4 and an edge of the window 2 are both formed with irregular cross-sections. The opening 4 (ID of the frame) and the window may have cross-sections of any shape, which may be similar or dissimilar. The mounting member 5, which may comprise one or more members, is shaped having a thickness and/or shape that is variable in one or more directions. That is, the OD and ID may not be constant in the axial direction, implying that the inner and outer surfaces (as opposed to the upper and lower surfaces) are beveled as shown in the figure. Because the OD and ID of the parts as shown differ in the axial direction, the solution to the athermalization formula will depend on the axial location, and thus the bond layer will not be of constant thickness from top to bottom of the bond. (The relative differences in bond thickness from top to bottom of the two bond lines will be roughly proportional to the relative differences in diameter from top to bottom of the joint.)

In operation, the vehicle window of the present disclosure may be installed by forming the one or more mounting members into a suitable shape for mounting the window into the opening. The mounting members are chosen to have a coefficient of thermal expansion (CTE) that is between the CTE of the vehicle structure and the CTE of the window to be placed in the opening in the vehicle structure. The mounting members and the window are then arranged in the opening with the use of a bonding agent (adhesive). In some examples, as discussed above, arranging the one or more mounting members forms a CTE gradient between the window and the vehicle structure. This may require the mounting members to be chosen from a number of dissimilar materials in order to form multiple layers having different CTEs.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. An optical element assembly for a vehicle, comprising:
 a plate having an opening therein;
 a optical element arranged in the opening;
 one or more mounting members arranged between the optical element and the plate, the one or more mounting members having a coefficient of thermal expansion (CTE) that is between a CTE of the plate and a CTE of the optical element; and
 a first bonding agent layer arranged around and outer edge of the optical agent between the one or more mounting members and the optical element; and
 a second bonding agent layer arranged between the one or more mounting members and the plate.

2. The optical element assembly of claim 1, further comprising an optical device.

3. The optical element assembly of claim 2, further comprising a sealed compartment, at least partially bounded by the window, at least a portion of the optical device being disposed in the sealed compartment.

4. The optical element assembly of claim 1, the one or more mounting members further comprising two or more concentric skirts.

5. The optical element assembly of claim 4, wherein the one or more mounting members form a CTE gradient between the window and the plate.

6. The optical element assembly of claim 1, the one or more mounting members further comprising a plurality of segments arranged along a perimeter of the window.

7. The optical element assembly of claim 1, wherein the opening in the plate has a profile similar to a profile of a corresponding edge of the window.

8. The optical element assembly of claim 1, the first and second bonding agent layers are formed of a silicone based adhesive.

\* \* \* \* \*